(12) United States Patent
Takahashi et al.

(10) Patent No.: US 8,749,704 B2
(45) Date of Patent: Jun. 10, 2014

(54) VIDEO TERMINAL AND METHOD FOR FORMING DISPLAY IMAGES

(75) Inventors: Masaki Takahashi, Tokyo (JP); Toshio Oka, Kanagawa (JP)

(73) Assignee: Panasonic Corporation, Osaka (JP)

( * ) Notice: Subject to any disclaimer, the term of this patent is extended or adjusted under 35 U.S.C. 154(b) by 42 days.

(21) Appl. No.: 13/379,510

(22) PCT Filed: Apr. 5, 2011

(86) PCT No.: PCT/JP2011/002022
§ 371 (c)(1),
(2), (4) Date: Dec. 20, 2011

(87) PCT Pub. No.: WO2011/145256
PCT Pub. Date: Nov. 24, 2011

(65) Prior Publication Data
US 2012/0099019 A1    Apr. 26, 2012

(30) Foreign Application Priority Data
May 18, 2010    (JP) .................................. 2010-114439

(51) Int. Cl.
*H04N 7/01*  (2006.01)
*H04N 11/20*  (2006.01)
*H04N 7/12*  (2006.01)
*H04N 11/02*  (2006.01)
*H04N 11/04*  (2006.01)
*H04N 7/173*  (2011.01)

(52) U.S. Cl.
USPC .................. 348/441; 348/14.02; 375/240.26; 725/90

(58) Field of Classification Search
None
See application file for complete search history.

(56) References Cited

U.S. PATENT DOCUMENTS

2007/0064811 A1*  3/2007  Zador et al. .............. 375/240.26
2007/0216761 A1*  9/2007  Gronner et al. ............ 348/14.02
2008/0028431 A1*  1/2008  Park ............................... 725/90
2011/0273618 A1  11/2011  Takahashi et al.

FOREIGN PATENT DOCUMENTS

| JP | 07-023378 | 1/1995 |
| JP | 2003-274221 | 9/2003 |
| JP | 2003-324728 | 11/2003 |
| JP | 2008-177757 | 7/2008 |

* cited by examiner

*Primary Examiner* — Jefferey Harold
*Assistant Examiner* — Sean Haiem
(74) *Attorney, Agent, or Firm* — Greenblum & Bernstein, P.L.C.

(57) ABSTRACT

A video terminal and display image forming method are provided that enable power consumption to be reduced while maintaining a moving image display quality level sensed by a user, even if a variety of types of images are displayed superimposed on a moving image, and a method of representing such images is complicated. In a video output apparatus (100), an update rate adjustment section (104) decides a moving image update rate based on a "moving image exposure area." Specifically, the update rate adjustment section (104) decides an update rate based on an update rate adjustment table in which moving image status pattern candidates are associated with update rate target values, and a moving image status pattern actually used in a display image forming section (103). A moving image status pattern candidate is a combination of "moving image exposure area," presence or absence of special processing, and type of special processing.

4 Claims, 10 Drawing Sheets

| INDEX | UPDATE RATE |
|---|---|
| 1,468,800,000 (MAXIMUM VALUE) | 60fps |
| 587,520,000 [pixel²] OR BELOW | 30fps |
| 293,760,000 [pixel²] OR BELOW | 15fps |
| 146,880,000 [pixel²] OR BELOW | 8fps |
| EXCEPTION: AIRBRUSHING OF MOVING IMAGE | |

FIG.7

MOVING IMAGE ON WHICH DIMMING PROCESSING HAS BEEN PERFORMED

MOVING IMAGE ON WHICH DIMMING PROCESSING AND AIRBRUSHING HAVE BEEN PERFORMED

| INDEX | UPDATE RATE |
|---|---|
| 100% OR BELOW | 60fps |
| 40% OR BELOW | 30fps |
| 20% OR BELOW | 15fps |
| 10% OR BELOW | 8fps |
| EXCEPTION: AIRBRUSHING OF MOVING IMAGE | |

FIG.10

VIDEO TERMINAL AND METHOD FOR FORMING DISPLAY IMAGES

TECHNICAL FIELD

The present invention relates to a video terminal and display image forming method.

BACKGROUND ART

Conventionally, there is, for example, a method of implementing energy saving in moving image display whereby a frame rate is controlled using a menu display on a screen as a trigger (see patent literature 1, for example).

In this method, it is first determined whether or not there is a digital camera menu display directive. Then, if there is no menu display directive, a through-screen frame rate of 30 fps is set, and video that has undergone video processing according to this set rate is output. On the other hand, if there is a menu display directive, a frame rate of 15 fps is set, and an image that has undergone video processing and a menu image are combined according to this set rate.

In a conventional method, having such frame rate control executed enables digital camera power consumption to be reduced when superimposed display of a through-screen and information provision image is performed in a digital camera.

CITATION LIST

Patent Literature

PTL 1
Japanese Patent Application Laid-Open No. 2003-274221

SUMMARY OF INVENTION

Technical Problem

In recent years, high resolution, high image quality, and a high frame rate have been required of video terminals, and these requirements also apply to mobile terminals having a video output function.

In recent years, also, video terminals have come to offer a variety of types of images superimposed on a moving image, and there is a trend toward more complicated methods of representing such images. There is also a demand for such image representation methods to provide more complicated representation, such as through the use of semi-transparent display or animation, for OSD (On-Screen Display), banners, dialog, and so forth, for example.

However, if only the presence or absence of a superimposed image in a moving image is used as an update rate switching criterion, as in the above conventional technology, depending on the superimposed image representation method a user may sense a decline in the moving image display quality level.

It is an object of the present invention to provide a video terminal and display image forming method that enable power consumption to be reduced while maintaining a moving image display quality level sensed by a user, even if a variety of types of images are displayed superimposed on a moving image, and a method of representing such images is complicated.

Solution to Problem

A video terminal of one aspect of the present invention is provided with: a display image forming section that forms a display image in which there is superimposed on a first image that is a moving image a second image belonging to a higher layer than the first image; and an update rate adjustment section that decides an update rate of the first image in the display image based on an exposure area in which the first image is exposed in the display image.

A display image forming method of one aspect of the present invention is provided with: a step of forming a display image in which there is superimposed on a first image that is a moving image a second image belonging to a higher layer than the first image; and a step of deciding an update rate of the first image in the display image based on an exposure area in which the first image is exposed in the display image.

Advantageous Effects of Invention

The present invention can provide a video terminal and display image forming method that enable power consumption to be reduced while maintaining a moving image display quality level sensed by a user, even if a variety of types of images are displayed superimposed on a moving image, and a method of representing such images is complicated.

BRIEF DESCRIPTION OF DRAWINGS

FIG. 7 is a drawing showing an example of an update rate adjustment table;

FIG. 10 is a drawing showing an example of an update rate adjustment table.

DESCRIPTION OF EMBODIMENTS

Now, embodiments of the present invention will be described in detail with reference to the accompanying drawings. In the embodiments, identical configuration elements are assigned the same reference codes, and duplicate descriptions thereof are omitted.

Embodiment 1

Figure 1:
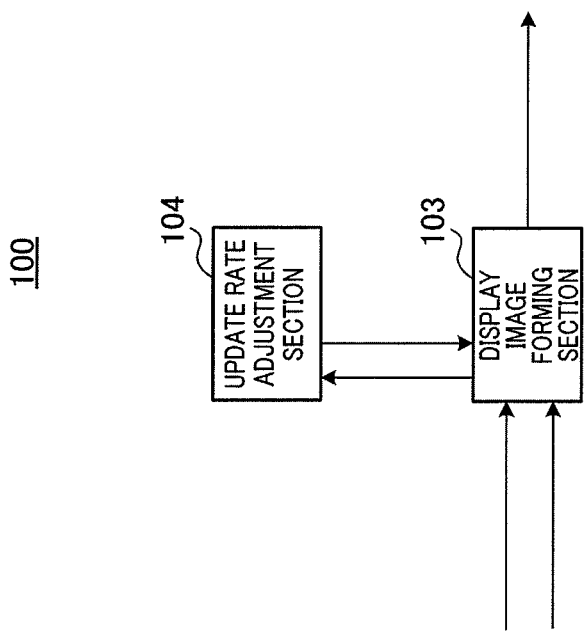
FIG. 1 is a block diagram showing the principal-part configuration of a video output apparatus according to Embodiment 1 of the present invention.

FIG. 1 is a block diagram showing the principal-part configuration of video output apparatus 100 according to Embodiment 1 of the present invention.

In FIG. 1, display image forming section 103 forms a display image in which there is superimposed on a first image that is a moving image a second image belonging to a higher layer than the first image, and update rate adjustment section 104 decides the update rate of the first image in the display image based on an exposure area in which the first image is exposed in the display image.

Figure 2:
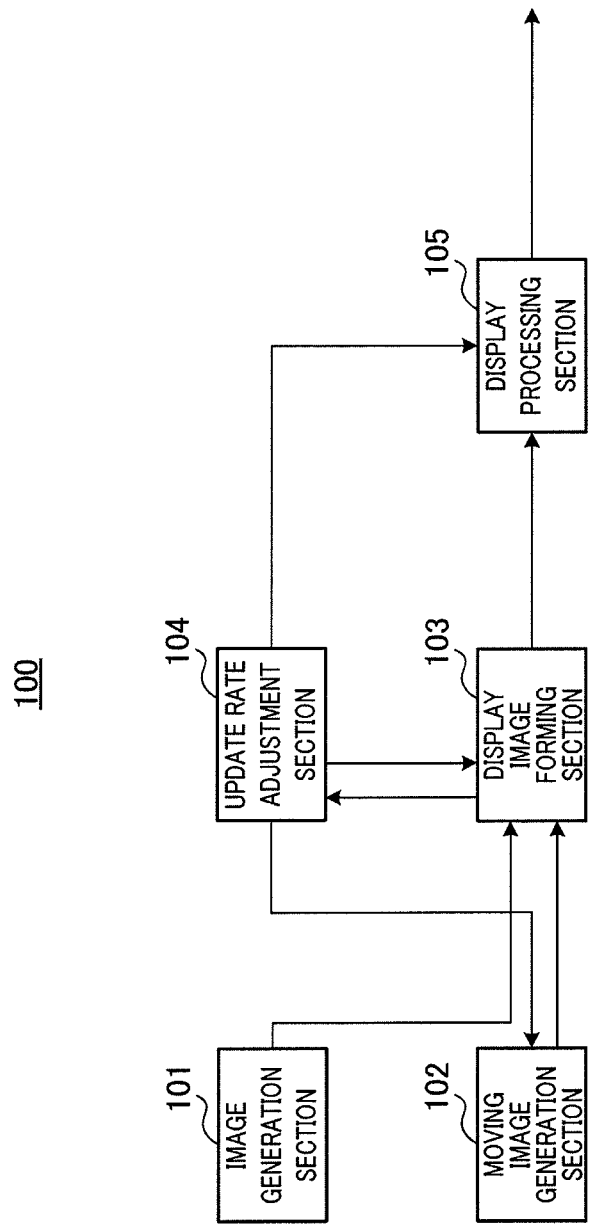
FIG. 2 is a block diagram showing the configuration of a video output apparatus according to Embodiment 1 of the present invention.

FIG. 2 is a block diagram showing the configuration of video output apparatus 100 according to Embodiment 1 of the present invention. In FIG. 2, video output apparatus 100 has image generation section 101, moving image generation section 102, display image forming section 103, update rate adjustment section 104, and display processing section 105.

Image generation section 101 generates image data of each image layer. Image layers comprise an upper layer and lower layer relative to a moving image layer. Specifically, image generation section 101 generates an upper layer component image that is the basis of an upper layer image (upper image). This upper layer image includes a banner, dialog, and so forth, for example. Also, image generation section 101 generates a lower layer component image that is the basis of a lower layer image (lower image). This lower layer image includes a background, for example. Furthermore, image generation section 101 generates a moving image layer image in which a moving image is inserted by display image forming section 103. An area in which a moving image is actually inserted (that is, a moving image insertion area) is provided in this moving image layer image. This moving image insertion area can be reduced taking a maximum moving image size as a maximum value, but will be described here as being fixed at the maximum moving image size in order to simplify the description.

Moving image generation section 102 generates moving image data and outputs this moving image data to display image forming section 103. Specifically, moving image generation section 102 is a moving image decoder, for example. Moving image generation section 102 decodes moving image data of a local file, network-distributed video, or video received from a TV tuner, and outputs post-decoding moving image data to display image forming section 103. Moving image generation section 102 may also generate animation and output this as moving image data.

Based on a control signal received from update rate adjustment section 104, moving image generation section 102 changes the decoding frame rate, frame interpolation processing interpolation interval, or frame puncturing processing puncturing interval. By this means, this embodiment enables the update rate of a moving image frame finally output from display processing section 105 to be adjusted.

Display image forming section 103 performs component image group combining (preliminary combining) on a layer-by-layer basis, combines images of all layers and a moving image received from moving image generation section 102, and outputs a composite image to display processing section 105. When this combining is performed, display image forming section 103 changes the moving image combining frequency based on a control signal received from update rate adjustment section 104. By this means, this embodiment enables the update rate of a moving image frame finally output from display processing section 105 to be adjusted. Also, display image forming section 103 may use semi-transparent combining processing or special processing (for example, airbrushing or dimming) at the time of preliminary combining for an upper layer. Semi-transparent combining processing (alpha processing) is combining processing that leaves a transparency value (alpha value).

Also, display image forming section 103 calculates a "moving image exposure area." Specifically, if semi-transparent combining processing has not been performed, display image forming section 103 calculates the area (for example, number of pixels) of an area not covered by an upper layer image (that is, a non-superimposition area) within a moving image insertion area. If semi-transparent combining processing has been performed, display image forming section 103 calculates the sum total of products of opacity and brightness in each unit area (for example, pixel) within a moving image insertion area. That is to say, a "moving image exposure area" is an area actually exposed in a state in which a moving image is displayed, or the sum total of products of opacity and brightness in each unit area (for example, pixel) within a moving image insertion area. Opacity in each unit area within a moving image insertion area is a value obtained by subtracting the transparency of an upper image superimposed on each unit area from a maximum transparency value.

Figure 3:
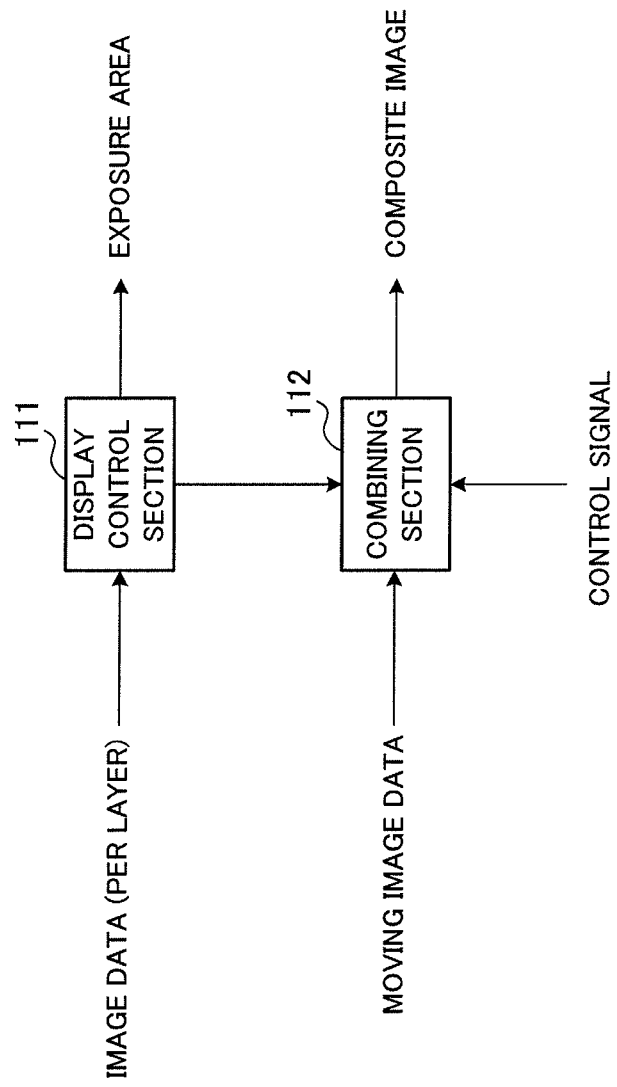
FIG. 3 is a block diagram showing the configuration of a display image forming section.

Specifically, as shown in FIG. 3, display image forming section 103 has display control section 111 and combining section 112.

Display control section 111 receives image data of each image layer from image generation section 101, and performs component image group combining (preliminary combining) on a layer-by-layer basis. This preliminary composite image is output to combining section 112. Then display control section 111 identifies a superimposition area and non-superimposition area within a moving image insertion area from the positional relationship between an upper layer image and moving image insertion area. Display control section 111 then calculates a "moving image exposure area" based on an identified superimposition area and non-superimposition area, the presence or absence of semi-transparent combining processing, and opacity.

Combining section 112 combines a preliminary composite image with a moving image received from moving image generation section 102, and outputs a composite image to display processing section 105. When this combining is performed, combining section 112 changes the moving image combining frequency based on a control signal received from update rate adjustment section 104.

Update rate adjustment section 104 decides the moving image update rate based on the "moving image exposure area" and the presence or absence and type of special processing. As explained above, a "moving image exposure area" is an area actually exposed in a state in which a moving image is displayed, or the sum total of products of opacity and brightness in each unit area (for example, pixel) within a moving image insertion area.

Specifically, update rate adjustment section 104 decides the update rate based on an update rate adjustment table, and a moving image status pattern actually used in display image forming section 103. An update rate adjustment table is a table in which moving image status pattern candidates are associated with update rate target values. A moving image status pattern candidate is a combination of "moving image exposure area," presence or absence of special processing, and type of special processing. The update rate adjustment table is held in memory (not shown) provided in update rate adjustment section 104.

Update rate adjustment section 104 generates an update rate control signal based on the decided update rate, and outputs this control signal to moving image generation section 102, display image forming section 103, and display processing section 105.

Figure 4:
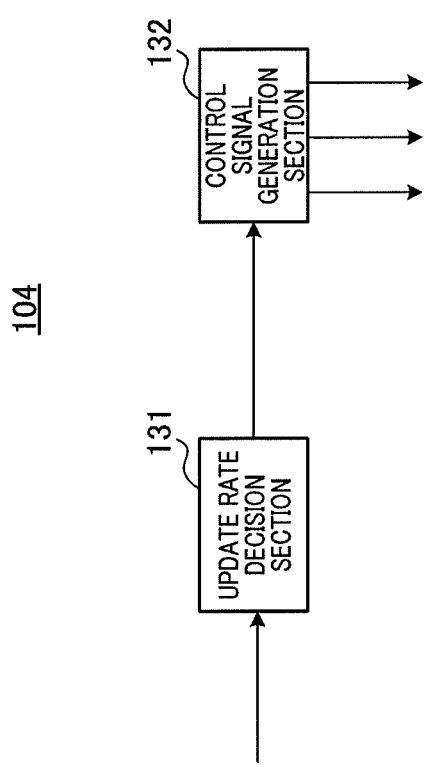
FIG. 4 is a block diagram showing the configuration of an update rate adjustment section.

Specifically, as shown in FIG. 4, update rate adjustment section 104 has update rate decision section 131 and control signal generation section 132. Within the above update rate adjustment section 104 processing, update rate decision processing is performed by update rate decision section 131, and update rate control signal generation processing is performed by control signal generation section 132.

Display processing section 105 receives a composite image from display image forming section 103, and performs control that causes a display section (for example, a display or projector, or the like) to display this composite image. When this control is performed, display processing section 105 changes the composite image update cycle based on an update rate control signal received from update rate adjustment section 104.

Figure 5:
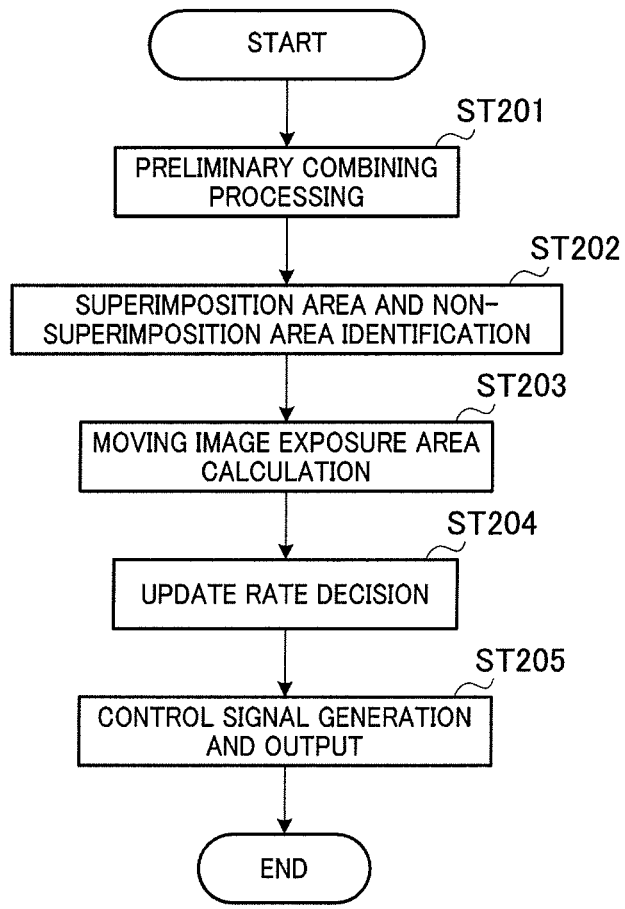
FIG. 5 is a flowchart provided to explain processing of a display image forming section and update rate adjustment section.
Figure 6:
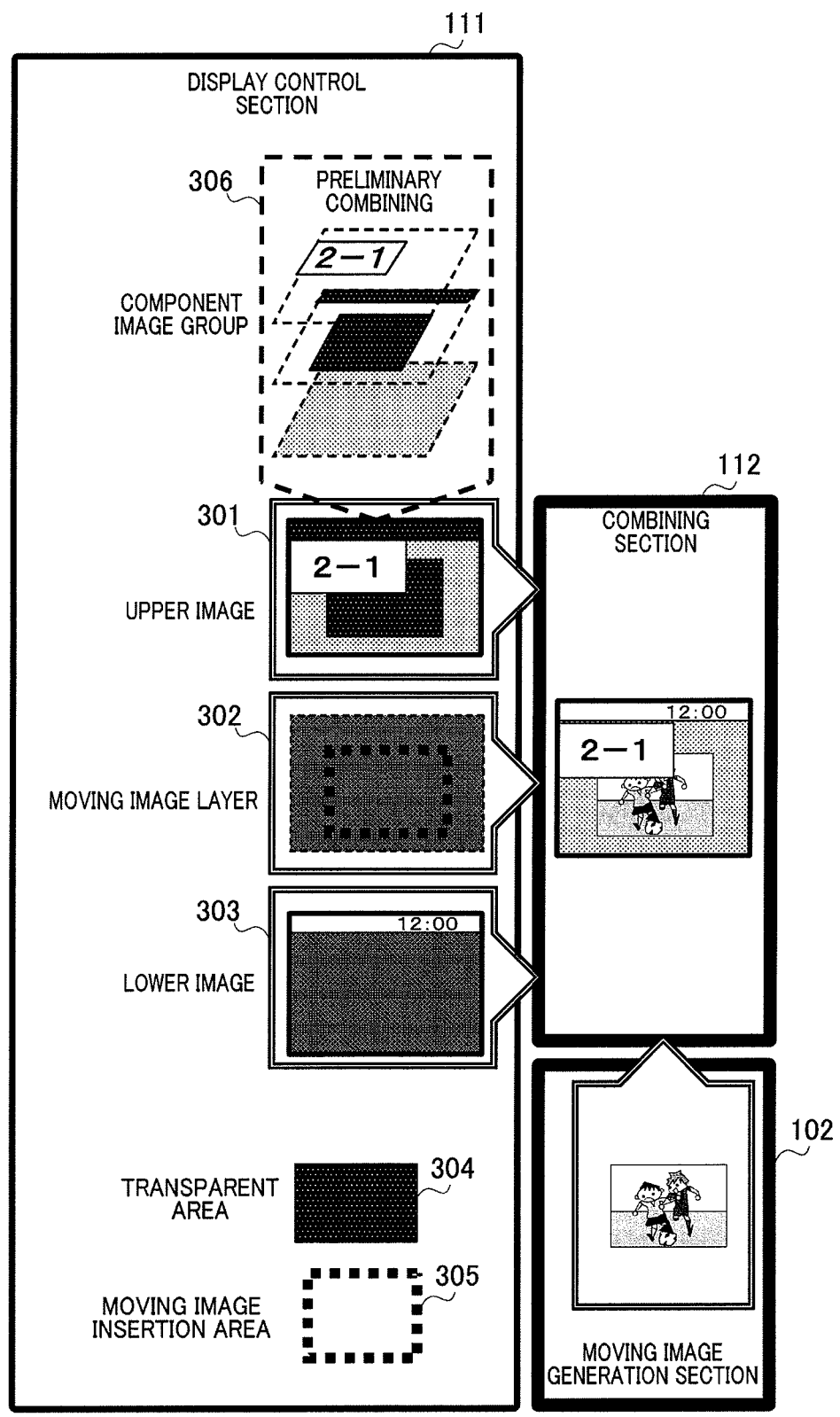
FIG. 6 is a drawing showing schematically image processing of a display image forming section and moving image generation section.

The operation of video output apparatus 100 having the above configuration will now be described with reference to FIGS. 5, 6, 7, and 8. FIG. 5 is a flowchart provided to explain processing of mainly display image forming section 103 and update rate adjustment section 104. FIG. 6 is a drawing showing schematically image processing of display image forming section 103 and moving image generation section 102. FIG. 7 is a drawing showing an example of an update rate adjustment table. FIG. 8 is a drawing showing an example of a displayed composite image.

In step ST201 in FIG. 5, display image forming section 103 receives image data of each image layer from image generation section 101, and performs component image group combining (preliminary combining) on a layer-by-layer basis.

For example, as shown in FIG. 6, display control section 111 performs preliminary combining of upper layer component image group 306, and forms upper layer image 301 (including, in FIG. 6, transparent area 304). Display control section 111 also forms moving image layer image 302 (including moving image insertion area 305, as shown in FIG. 6) and lower image layer 303. Here, the description presupposes that 3-plane combining of upper image 301, moving image layer image 302, and lower image 303 is performed, but the present invention is not limited to this. In this embodiment, for example, combining section 112 may also perform 2-plane combining without the presence of lower image 303. Also, in this embodiment, provision may be made for preliminary combining of component image group 306 in upper image 301 not to be performed, and for combining or semi-transparent combining of component image group 306 constituting an upper layer of moving image layer image 302 to be performed sequentially.

Returning to FIG. 5, in step ST202 display image forming section 103 identifies a superimposition area and non-superimposition area within a moving image insertion area from the positional relationship of an upper layer image and the moving image insertion area.

In step ST203, display image forming section 103 calculates a "moving image exposure area" based on an identified superimposition area and non-superimposition area, the presence or absence of semi-transparent combining processing, and opacity. As explained above, a "moving image exposure area" is an area actually exposed in a state in which a moving image is displayed, or the sum total of products of opacity and brightness in each unit area (for example, pixel) within a moving image insertion area. It is also acceptable for a moving image exposure area to be only the opacity sum total or only the brightness sum total.

In step ST204, update rate adjustment section 104 decides the update rate based on an update rate adjustment table, and a moving image status pattern actually used in display image forming section 103. An update rate adjustment table is a table in which moving image status pattern candidates are associated with update rate target values. A moving image status pattern candidate is a combination of "moving image exposure area," presence or absence of special processing, and type of special processing.

The update rate adjustment table has the kind of configuration shown in FIG. 7, for example. FIG. 7 shows an example of an update rate adjustment table that presupposes the following. Namely, update rate adjustment table presuppositions are that the size of moving image insertion area 305 is 800 pixels×480 pixels, an upper image transparency value is indicated in the range [0, 255], with 0 indicating complete transparency and 255 indicating opacity, and moving image brightness is indicated by a numeric value as a brightness value in the range [0, 15], with 0 signifying invisibility, and 15 signifying the brightness of an original moving image. Based on these presuppositions, a "moving image exposure area" is calculated as follows in above step ST203. Namely, "moving image exposure area"="first pixel: (opacity value)×brightness value"+"second pixel: (opacity value)×brightness value"+ . . . +"384,000th pixel: (opacity value)×brightness value." Here, opacity is the result of subtracting a per-pixel transparency value from the maximum value of 255.

Then, when using FIG. 7, update rate adjustment section 104 decides an update rate corresponding to a range represented by a numeral given in an index entry to which the calculated "moving image exposure area" belongs. If special processing called airbrushing has been used on a moving image, update rate adjustment section 104 decides upon a predetermined update rate (in FIG. 7, the minimum update rate of 8 fps) irrespective of the "moving image exposure area."

Figure 8A:
FIG. 8 is a drawing showing an example of a displayed composite image.
Figure 8B:
Figure 8C:
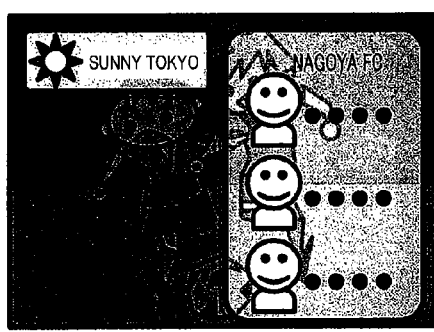
Figure 8D:

To be more precise, if there is no upper image on a moving image, or if there is but it is very minor, as shown in FIGS. 8A and 8B, the maximum value of 60 fps is set. If an upper image is superimposed on a moving image and dimming has also been executed on the moving image, as shown in FIG. 8C, a user does not sense anything unnatural even if the update rate is lowered, and therefore an update rate of 30 fps, for example, is set. And if airbrushing has been performed on a moving image, as shown in FIG. 8D, the minimum update rate of 8 fps, for example, is set.

Returning to FIG. 5, in step ST205 update rate adjustment section 104 generates an update rate control signal based on the decided update rate, and outputs this control signal to moving image generation section 102, display image forming section 103, and display processing section 105. Here, update rate adjustment section 104 outputs an update rate control signal to all of moving image generation section 102, display image forming section 103, and display processing section 105, but the present invention is not limited to this. Update rate adjustment section 104 may output an update rate control signal to any one of image generation section 102, display image forming section 103, or display processing section 105. Alternatively, update rate adjustment section 104 may output an update rate control signal to any combination of image generation section 102, display image forming section 103, and/or display processing section 105. That is to say, in this embodiment, it is sufficient to be able to adjust a moving image frame update rate finally output from display processing section 105.

Then, as shown in FIG. 6, combining section 112 combines a preliminary composite image with a moving image received from moving image generation section 102, and outputs a composite image to display processing section 105.

As described above, in video output apparatus 100 according to this embodiment, update rate adjustment section 104 decides a moving image update rate based on a "moving image exposure area."

By this means, this embodiment enables power consumption to be reduced while maintaining a moving image display quality level sensed by a user, even if a variety of types of images are displayed superimposed on a moving image, and a method of representing such images is complicated.

In the above description, a moving image insertion area is described as being fixed at the maximum moving image size, but the present invention is not limited to this, and a moving image insertion area may also be reduced in size. In this case, the ratio between the area of a moving image insertion area and the area of a non-superimposition area may be treated as a "moving image exposure area."

Embodiment 2

In Embodiment 2, an embodiment is described in which an upper layer image is not superimposed on a moving image insertion area, and a moving image insertion area is reducible in size.

The basic configuration of a video output apparatus according to Embodiment 2 is common to Embodiment 1, and will therefore be described using FIG. 2.

Display image forming section 103 of video output apparatus 100 according to Embodiment 2 calculates a "moving image exposure area." In Embodiment 2, the ratio of the size of a moving image insertion area to the maximum moving image size that can be displayed by video output apparatus 100 (that is, a "size ratio") is used as a "moving image exposure area."

Update rate adjustment section 104 decides the moving image update rate based on the "size ratio" and the presence or absence and type of special processing. Specifically, update rate adjustment section 104 decides the update rate based on an update rate adjustment table, and a moving image status pattern actually used in display image forming section 103. Here, an update rate adjustment table is a table in which moving image status pattern candidates are associated with update rate target values. A moving image status pattern candidate is a combination of "reduction ratio," presence or absence of special processing, and type of special processing. The update rate adjustment table is held in memory (not shown) provided in update rate adjustment section 104.

Figure 9:
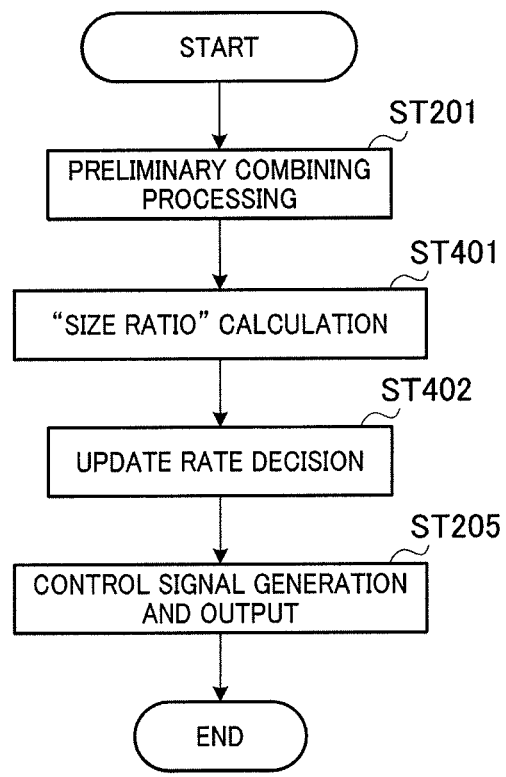
FIG. 9 is a flowchart provided to explain processing of a display image forming section and update rate adjustment section according to Embodiment 2 of the present invention.

The operation of video output apparatus 100 having the above configuration will now be described with reference to FIGS. 9 and 10. FIG. 9 is a flowchart provided to explain processing of mainly display image forming section 103 and update rate adjustment section 104. FIG. 10 is a drawing showing an example of an update rate adjustment table.

In step ST401 in FIG. 9, display image forming section 103 calculates a "size ratio."

In step ST402, update rate adjustment section 104 decides the update rate based on an update rate adjustment table, and a moving image status pattern actually used in display image forming section 103. Here, an update rate adjustment table is a table in which moving image status pattern candidates are associated with update rate target values. A moving image status pattern candidate is a combination of "size ratio," presence or absence of special processing, and type of special processing.

The update rate adjustment table has the kind of configuration shown in FIG. 10, for example. When FIG. 10 is used, an update rate corresponding to a range represented by a numeral given in an index entry to which the calculated "size ratio" belongs is decided upon. Specifically, the smaller the size ratio, the smaller is the update rate that is set. This is because the smaller the image size, the less a user senses anything unnatural even if the update rate is lowered. If special processing called airbrushing has been used on a moving image, update rate adjustment section 104 decides upon a predetermined update rate (in FIG. 10, the minimum update rate of 8 fps) irrespective of the "size ratio."

As described above, in video output apparatus 100 according to this embodiment, update rate adjustment section 104 decides a moving image update rate based on a "size ratio."

By this means, this embodiment enables power consumption to be reduced while maintaining a moving image display quality level sensed by a user, even if a variety of types of images are displayed superimposed on a moving image, and a method of representing such images is complicated.

Other Embodiments (1) Embodiment 1 and Embodiment 2 may be combined. That is to say, in this embodiment, it is determined whether or not a moving image insertion area is of the maximum image size, and if it is of the maximum image size, the processing flow of Embodiment 1 is executed. On the other hand, if the moving image insertion area is not of the maximum image size (for example, if the moving image insertion area has been reduced in size), the processing flow of Embodiment 2 is executed in this embodiment.

(2) In the above embodiments, update rate adjustment section 104 may gradually bring an actual moving image update rate closer to a decided update rate (target value). By this means, this embodiment can alleviate or prevent a sense of strangeness experienced by a viewer when the update rate changes abruptly. Also, in order to obtain the same effect, moving image generation section 102, display image forming section 103, and display processing section 105 may each gradually bring the update rate closer to an adjustment target value indicated by a control signal received from update rate adjustment section 104.

(3) In the above embodiments, a case has been described in which a moving image insertion area is one closed area, but the present invention is not limited to this, and there may also be a plurality of independent moving image insertion areas. In this case, the moving image update rate may be decided for each of the plurality of independent areas, or an overall update rate may be decided, treating the plurality of independent areas as one area.

(4) In the above embodiments, a case has been described by way of example in which the present invention is configured as hardware, but it is also possible for the present invention to be implemented by means of software in conjunction with hardware.

The function blocks used in the descriptions of the above embodiments are typically implemented as LSIs, which are integrated circuits. These may be implemented individually as single chips, or a single chip may incorporate some or all of them. Here, the term LSI has been used, but the terms IC, system LSI, super LSI, and ultra LSI may also be used according to differences in the degree of integration.

The method of implementing integrated circuitry is not limited to LSI, and implementation by means of dedicated circuitry or a general-purpose processor may also be used. An FPGA (Field Programmable Gate Array) for which programming is possible after LSI fabrication, or a reconfigurable processor allowing reconfiguration of circuit cell connections and settings within an LSI, may also be used in implementing integrated circuitry.

In the event of the introduction of an integrated circuit implementation technology whereby LSI is replaced by a different technology as an advance in, or derivation from, semiconductor technology, integration of the function blocks of these embodiments may of course be performed using that technology. The application of biotechnology or the like to these embodiments is also a possibility.

The disclosure of Japanese Patent Application No. 2010-114439, filed on May 18, 2010, including the specification, drawings and abstract, is incorporated herein by reference in its entirety.

INDUSTRIAL APPLICABILITY

A video terminal and display image forming method of the present invention are useful in enabling power consumption to be reduced while maintaining a moving image display quality level sensed by a user, even if a variety of types of images are displayed superimposed on a moving image, and a method of representing such images is complicated.

REFERENCE SIGNS LIST

100 Video output apparatus
101 Image generation section
102 Moving image generation section
103 Display image forming section
104 Update rate adjustment section
105 Display processing section
111 Display control section
112 Combining section
131 Update rate decision section
132 Control signal generation section

The invention claimed is:

1. A video terminal, comprising:
   a display image former that generates a display image including a first image that is a moving image and a second image belonging to a higher layer than the first image, the second image being superimposed on the first image; and
   an update rate adjuster that determines an update rate of the first image in the display image based on a comparison between a first exposure area of the first image and a first threshold, the first exposure area is a number of pixels of an area not covered by the second image within an insertion area of the first image in the display image when semi-transparent combining processing has not been performed,
   wherein the update rate adjuster determines the update rate based on a comparison between a second exposure area and a second threshold, the second exposure area is a sum of products of opacity and brightness in each unit area within the insertion area when semi-transparent combining processing has been performed.

2. The video terminal according to claim 1, wherein the update rate adjuster uses a ratio between the insertion area and the area not covered by the second image within the insertion area, as the first exposure area.

3. The video terminal according to claim 1, wherein the update rate adjuster gradually brings an actual update rate of the first image closer to the determined update rate.

4. A display image generating method, comprising:
   generating a display image including a first image that is a moving image and a second image belonging to a higher layer than the first image, the second image being superimposed on the first image; and
   determining an update rate of the first image in the display image based on a comparison between an exposure area of the first image and a threshold, the exposure area is a number of pixels of an area not covered by the second image within an insertion area of the first image in the display image when semi-transparent combining processing has not been performed,
   wherein the determining determines the update rate based on a comparison between a second exposure area and a second threshold, the second exposure area is a sum of products of opacity and brightness in each unit area within the insertion area when semi-transparent combining processing has been performed.

* * * * *